United States Patent

Haimovich et al.

[11] Patent Number: 6,116,298
[45] Date of Patent: Sep. 12, 2000

[54] FUELING SYSTEM

[75] Inventors: Yosef Haimovich, Rishon le Zion; Yehuda Armoni, Reut, both of Israel

[73] Assignee: Hi-G-Tek Ltd., Or-Yehuda, Israel

[21] Appl. No.: 09/262,122

[22] Filed: Mar. 3, 1999

Related U.S. Application Data

[63] Continuation-in-part of application No. 08/815,389, Mar. 11, 1997, Pat. No. 6,002,343.

[30] Foreign Application Priority Data

Oct. 28, 1996 [IL] Israel .................................... 119509
Mar. 17, 1998 [IL] Israel .................................... 123708

[51] Int. Cl.⁷ .................................................... B65B 1/30
[52] U.S. Cl. ............................ 141/94; 141/98; 141/231
[58] Field of Search ................................ 141/94, 98, 231; 340/825.35, 825.72

[56] References Cited

U.S. PATENT DOCUMENTS

| | | | |
|---|---|---|---|
| 3,642,036 | 2/1972 | Ginsburgh et al. | 141/94 |
| 4,109,686 | 8/1978 | Phillips | 141/1 |
| 4,263,945 | 4/1981 | Van Ness | 141/98 |
| 4,469,149 | 9/1984 | Walkey et al. | 141/94 |
| 4,748,668 | 5/1988 | Shamir et al. | 380/30 |
| 4,846,233 | 7/1989 | Fockens | 141/94 |
| 4,934,419 | 6/1990 | Lamont et al. | 141/94 |
| 5,097,253 | 3/1992 | Eschbach et al. | 340/545 |
| 5,156,198 | 10/1992 | Hall | 141/94 |
| 5,249,612 | 10/1993 | Parks et al. | 141/94 |
| 5,448,638 | 9/1995 | Johnson et al. | 380/23 |
| 5,596,501 | 1/1997 | Comer et al. | 340/825.35 |
| 5,605,182 | 2/1997 | Oberrecht et al. | 141/94 |
| 5,646,592 | 7/1997 | Tuttle | 340/572 |
| 5,656,996 | 8/1997 | Houser | 340/541 |
| 5,857,501 | 1/1999 | Kelerich et al. | 141/94 |
| 5,906,228 | 5/1999 | Keller | 141/94 |
| 5,913,180 | 6/1999 | Ryan | 340/825.35 |
| 5,923,572 | 7/1999 | Pollock | 141/94 |
| 5,944,069 | 8/1999 | Nusbaumer et al. | 141/94 |
| 5,969,691 | 10/1999 | Myers | 340/825.72 |

FOREIGN PATENT DOCUMENTS

| | | | |
|---|---|---|---|
| 0 736 484 | 10/1996 | European Pat. Off. | B67D 5/04 |
| WO 97/35284 | 10/1996 | European Pat. Off. | B67D 5/04 |
| 0 822 160 | 4/1998 | European Pat. Off. | B67D 5/22 |
| 38 17 428 | 11/1989 | Germany | G07C 11/00 |
| WO 95/14612 | 6/1995 | WIPO | B65B 1/30 |

OTHER PUBLICATIONS

U.S. Patent Application No.: 08/815,389.

*Primary Examiner*—Steven O. Douglas
*Assistant Examiner*—Khoa D. Huynh
*Attorney, Agent, or Firm*—Abelman, Frayne & Schwab

[57] ABSTRACT

A fueling system including a fuel supply subsystem including at least one fueling nozzle, a recipient identifier associated with a fill location of a recipient fuel store, a fueling communicator associated with the at least one fueling nozzle and communicating in a wireless manner with the recipient identifier, at least in order to obtain recipient identification information therefrom, and an authorization and monitoring assembly operative to communicate in a wireless manner with the fueling communicator for receiving at least recipient identification information therefrom.

5 Claims, 3 Drawing Sheets

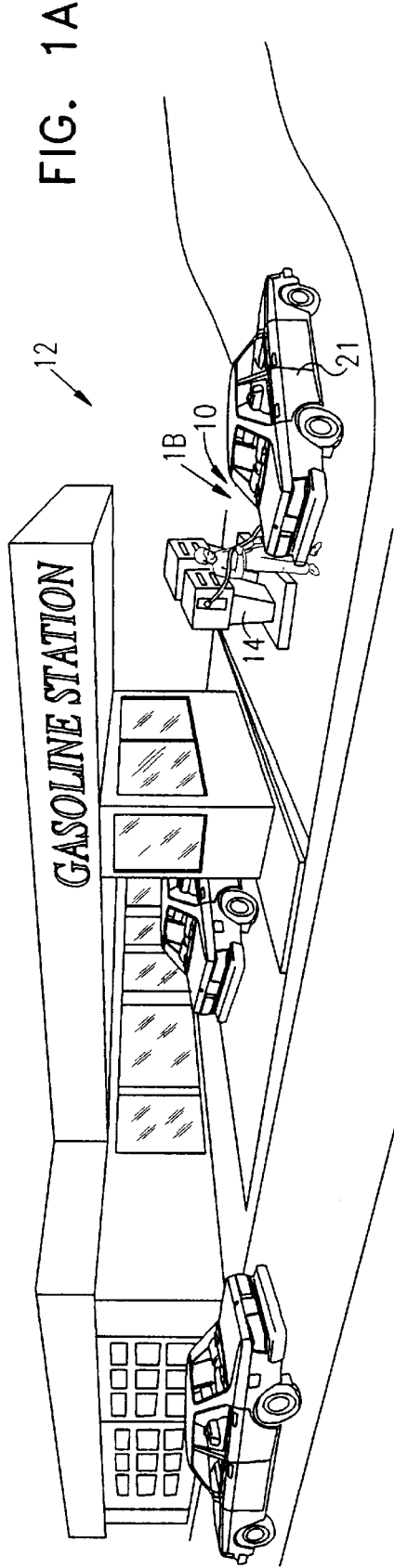
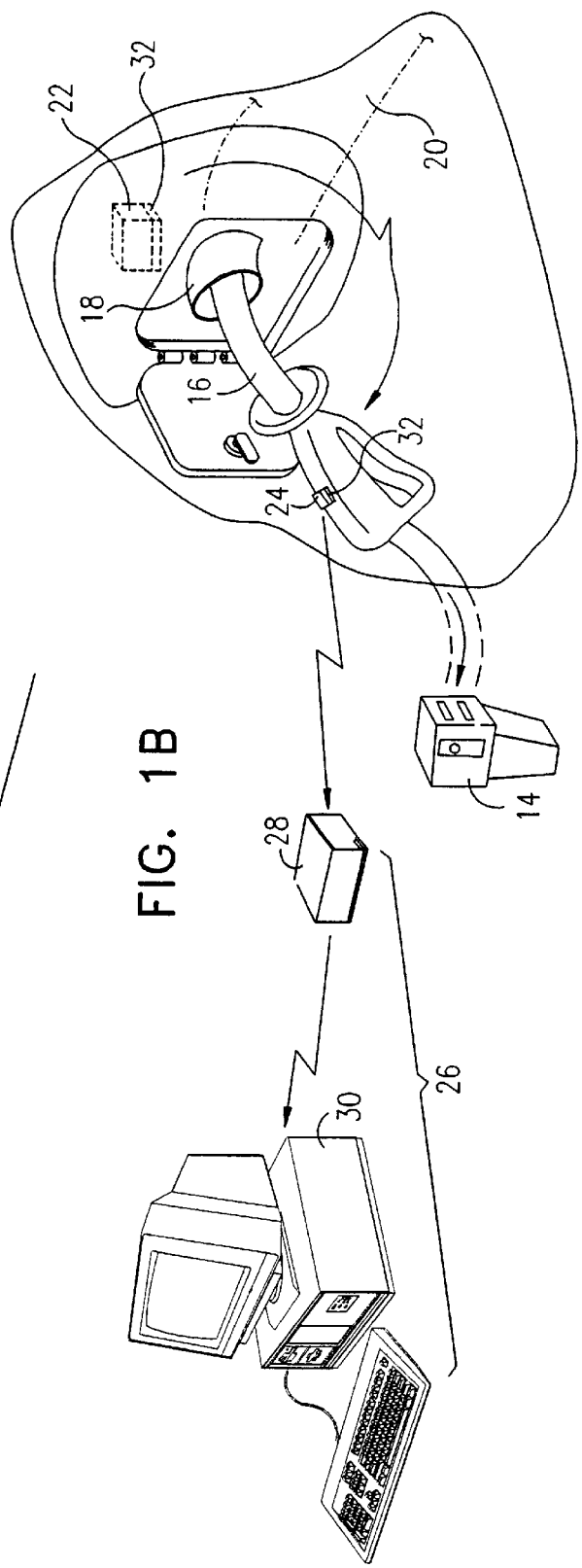
FIG. 1A
FIG. 1B 006,116,298

FUELING SYSTEM

This is a continuation-in-part application of U.S. patent application Ser. No. 08/815,389, filed Mar. 11, 1997, now U.S. Pat. No. 6,002,343.

FIELD OF THE INVENTION

The present invention relates generally to fuel management systems for use with motor vehicles and particularly to a wireless system for authorization and monitoring of fuel delivery.

BACKGROUND OF THE INVENTION

Fuel management systems which monitor fuel usage by vehicles and record the identity and other particulars of vehicles being fueled are known. Patents showing fuel management systems include the following U.S. Pat. Nos.: 5,156,198; 4,934,419; 4,846,233; 4,469,149; 4,263,945; 4,109,686 and 3,642,036. In addition, PCT published patent application WO 95/14612 describes a vehicle mounted fueling system identification unit which employs an inductive communication loop arranged to surround a fuel intake pathway of a vehicle. Circuitry is provided which transmits, via the loop, various parameters, such as vehicle identification number, credit information, and required fuel particulars.

A drawback to prior art systems is that they require wired connections to transmit the fuel/vehicle parameters.

SUMMARY OF THE INVENTION

The present invention seeks to provide a wireless system for authorization and monitoring of fuel delivery.

There is thus provided in accordance with a preferred embodiment of the present invention a fueling system including a fuel supply subsystem including at least one fueling nozzle, a recipient identifier associated with a fill location of a recipient fuel store, a fueling communicator associated with the fueling nozzle and communicating in a wireless manner with the recipient identifier, at least in order to obtain recipient identification information therefrom, and an authorization and monitoring assembly operative to communicate in a wireless manner with the fueling communicator for receiving at least recipient identification information therefrom.

In accordance with a preferred embodiment of the present invention the authorization and monitoring assembly is also operative to communicate in a wireless manner with the fuel supply subsystem to authorize supply of fuel to the recipient.

Further in accordance with a preferred embodiment of the present invention the fueling communicator communicates with at least one of the authorization and monitoring assembly and the recipient identifier in an encrypted manner.

Still further in accordance with a preferred embodiment of the present invention the fueling communicator communicates with at least one of the authorization and monitoring assembly and the recipient identifier in a manner requiring authentication by at least one of the authorization and monitoring assembly and the recipient identifier.

In accordance with a preferred embodiment of the present invention the fueling communicator is mounted onto the nozzle at least partially by means of an anti-theft tag including a monitored attachment mechanism which attaches the tag to the nozzle and which provides an output indication of tampering with the attachment mechanism.

Additionally in accordance with a preferred embodiment of the present invention the recipient identifier is mounted at the fill location of the recipient fuel store at least partially by means of an anti-theft tag including a monitored attachment mechanism which attaches the tag to the fill location of the fuel store and which provides an output indication of tampering with the attachment mechanism.

BRIEF DESCRIPTION OF THE DRAWINGS

The present invention will be understood and appreciated more fully from the following detailed description, taken in conjunction with the drawings in which:

FIG. 1A is a simplified illustration of a fueling system constructed and operative in accordance with a preferred embodiment of the present invention embodied in a filling station;

FIG. 1B is a more detailed illustration of components of the fueling system of FIG. 1A;

DETAILED DESCRIPTION OF A PREFERRED EMBODIMENT

Figure 2:
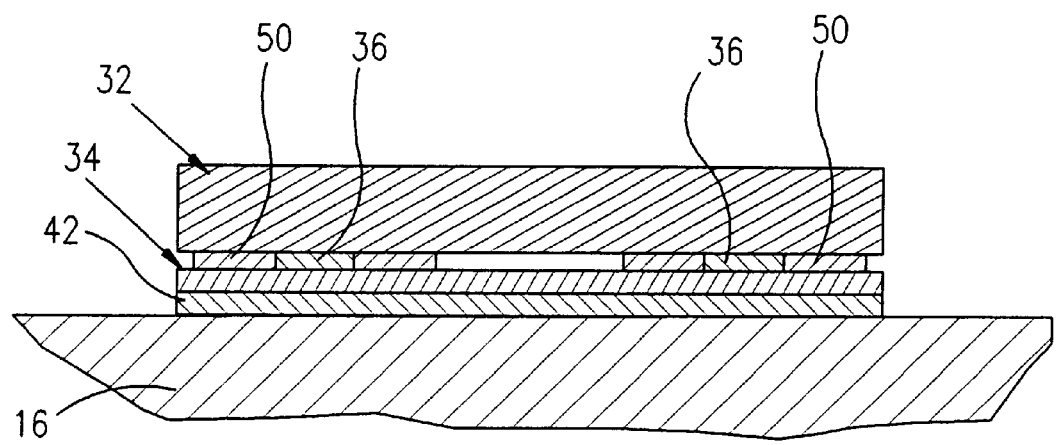
FIG. 2 is a simplified sectional illustration of an anti-theft tag used to mount certain components of the fueling system of FIG. 1 in accordance with a preferred embodiment of the present invention.

Reference is now made to FIGS. 1A and 1B which illustrate a fueling system 10 constructed and operative in accordance with a preferred embodiment of the present invention embodied in a filling station 12.

Fueling system 10 includes a fuel supply subsystem 14 which includes one or more fueling nozzles 16. In FIG. 1B, one of the fueling nozzles 16 is being used to supply fuel to a fuel intake pipe 18 of a fuel tank 20 of a vehicle 21, herein referred to as a fill location 18 of a recipient fuel store 20. A recipient identifier 22 is provided in association with fill location 18. Recipient identifier 22 is preferably mounted inside vehicle 21 in propinquity to fill location 18. Recipient identifier 22 preferably comprises a transceiver for wirelessly communicating recipient identification information to a fueling communicator 24 which is preferably mounted on fueling nozzle 16. Typical recipient identification information may include vehicle license plate number, charge account number and credit status, for example.

Fueling communicator 24 preferably comprises a transceiver for wirelessly communicating data, such as the recipient identification information, to an authorization and monitoring assembly 26. Assembly 26 preferably includes a transceiver 28 which communicates with a CPU 30 which controls and manages operation of filling station 12.

A typical example of operation of fueling system 10 is as follows. Nozzle 16 is initially inserted in fill location 18. Recipient identifier 22 is activated, such as by the insertion of nozzle 16 or by some other mechanism, to wirelessly transmit the recipient identification information to fueling communicator 24. Fueling communicator 24 relays this information to assembly 26. Upon verification of the information by CPU 30, transceiver 28 of assembly 26 preferably wirelessly communicates with fuel supply subsystem 12 to authorize supply of fuel to vehicle 21.

In accordance with a preferred embodiment of the present invention, in order to increase communication security, fueling communicator 24 communicates with assembly 26 and/or recipient identifier 22 in an encrypted manner. For example, well known encryption algorithms, such as RC-5, DES or DVB, may be employed. To provide an even greater level of trust, mutual zero-knowledge interaction authentication sessions between fueling communicator 24, assembly 26 and/or recipient identifier 22 may be held, such as the so-called Fiat-Shamir authentication methods taught in U.S. Pat. No. 4,748,668 to Shamir and Fiat, the disclosure of which is incorporated herein by reference.

As one example, fueling communicator 24 may communicate with assembly 26 in a manner requiring authentication by recipient identifier 22. Additionally or alternatively, fueling communicator 24 may communicate with assembly 26 only upon authorization from assembly 26 itself. Similarly, fueling communicator 24 may communicate with recipient identifier 22 in a manner requiring authentication by assembly 26. Additionally or alternatively, fueling communicator 24 may communicate with recipient identifier 22 only upon authorization from recipient identifier 22 itself.

In accordance with a preferred embodiment of the present invention fueling communicator 24 is mounted onto nozzle 16 at least partially by means of an anti-theft tag 32 including a monitored attachment mechanism 34 which attaches tag 32 to nozzle 16 and which provides an output indication of tampering with attachment mechanism 34.

Reference is now made to FIG. 2 which illustrates tag 32. Tag 32 is preferably a tag of the type described in applicant/assignee's U.S. Pat. No. 6,002,343, the disclosure of which is incorporated herein by reference. Tag 32 preferably includes electronics (not shown) comprising a battery, a receiver antenna, receiver circuitry, a transmitter antenna, transmitter circuitry, a microprocessor, a timer, a logic and memory component, an analog-to-digital (A/D) converter and a current source, for example. The electronics of tag 32 is not limited to the abovementioned components, and may include more or less components, depending upon the application.

The electronics of tag 32 are in electrical communication with an electrically resistive element 34, such as via I/O pads 36. Resistive element 34 is preferably bonded to an nozzle 16 with an adhesive 42 so as to define an electrical resistance. Any change in bonding of element 34 to nozzle 16 causes a change in the electrical resistance. Adhesive 42 may be a double sided adhesive tape or adhesive foam.

Resistive element 34 may be constructed in a variety of manners, as taught in U.S. Pat. No. 6,002,343. For example, resistive element 34 may be printed in any suitable pattern to provide a desired resistance value which may be adjusted after curing by laser trimming, abrasion or mechanical punching, for example. Resistive element 34 is preferably attached to tag 32 by means of a conductive adhesive 50, such as a metal impregnated adhesive. Preferably the adhesive strength of adhesive 42 is greater than the adhesive strength of conductive adhesive 50, so that removal of tag 32 from nozzle 16 causes shearing or other deformation of conductive adhesive 50, and alters the resistance of resistive element 34. Alteration of the resistance of element 34 may then alert fueling system 10 of tampering with the system.

Similarly, recipient identifier 22 may be mounted at fill location 18 by means of anti-theft tag 32.

Figure 3:
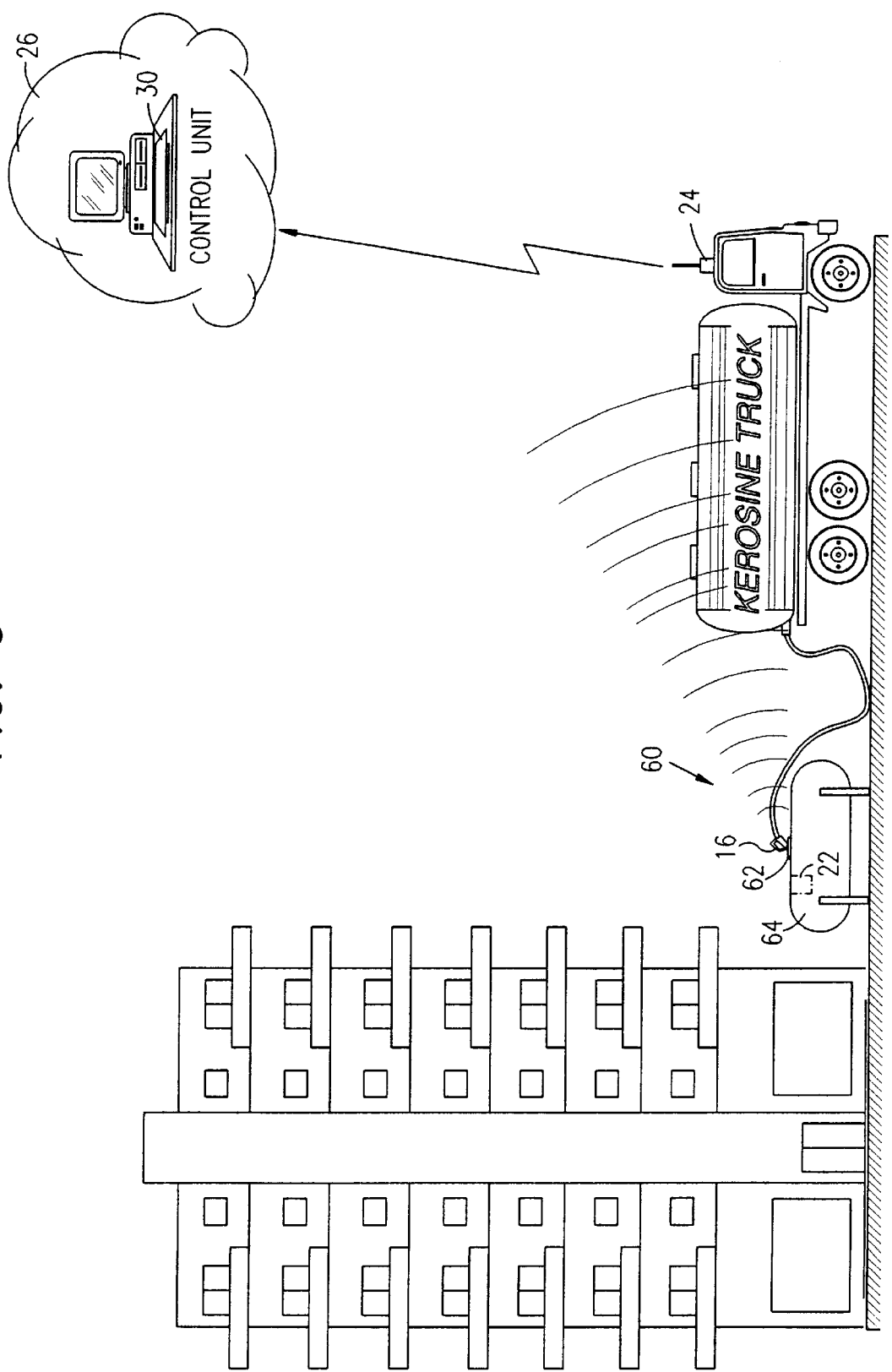
FIG. 3 is a simplified illustration of a fueling system constructed and operative in accordance with a preferred embodiment of the present invention embodied in mobile fueling system.

Reference is now made to FIG. 3 which illustrates a fueling system 60 constructed and operative in accordance with a preferred embodiment of the present invention embodied in mobile fueling system. Fueling system 60 is substantially identical with fueling system 10, except that in fueling system 60, the fill location is a fuel intake pipe 62 and the recipient fuel store is a fuel tank 64 of a domicile. Fueling communicator 24 is mounted in a cabin or on top of a fuel delivery truck.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A fueling system comprising:

a fuel supply subsystem including at least one fueling nozzle;

a recipient identifier associated with a fill location of a recipient fuel store;

a fueling communicator associated with said at least one fueling nozzle and communicating in a wireless manner with said recipient identifier, at least in order to obtain recipient identification information therefrom wherein said fueling communicator is mounted onto said at least one nozzle at least partially by means of an anti-theft tag including a monitored attachment mechanism which attaches the tag to said at least one nozzle and which provides an output indication of tampering with said attachment mechanism;

an authorization and monitoring assembly operative to communicate in a wireless manner with said fueling communicator for receiving at least recipient identification information therefrom; and an electrically resistive element in electrical communication with and attached to said tag, wherein tampering with the electrically resistive element causes a change in said electrical resistance, said change in electrical resistance being communicated to said tag, wherein said resistive element comprises a multiplicity of resistive wires, wherein only a random number of said wires are electrically connected to internal connection points in said tag such that said resistive element has a statistically random electrical resistance.

2. The fueling system according to claim 1 wherein said authorization and monitoring assembly is also operative to communicate in a wireless manner with said fuel supply subsystem to authorize supply of fuel to said fill location.

3. The fueling system according to claim 1 wherein said fueling communicator communicates with at least one of said authorization and monitoring assembly and said recipient identifier in an encrypted manner.

4. The fueling system according to claim 1 wherein said fueling communicator communicates with at least one of said authorization and monitoring assembly and said recipient identifier in a manner requiring authentication by at least one of said authorization and monitoring assembly and said recipient identifier.

5. The fueling system according to claim 1 wherein said recipient identifier is mounted at said fill location of said recipient fuel store at least partially by means of an anti-theft tag including a monitored attachment mechanism which attaches the tag to said fill location of said fuel store and which provides an output indication of tampering with said attachment mechanism.

* * * * *